UNITED STATES PATENT OFFICE 2,598,434

PREPARATION OF ORGANOHALOGENOSILANES FROM ORGANOHALOGENOPOLYSILANES

Donald Mohler, Schenectady, and Jesse E. Sellers, Scotia, N. Y., assignors to General Electric Company, a corporation of New York No Drawing. Application August 18, 1949, Serial No. 111,101

6 Claims. (Cl. 260—448.2)

This invention relates to the preparation of organohalogenosilanes. More particularly, the invention is concerned with a method for preparing organohalogenosilanes which comprises heating an organohalogenopolysilane containing a silicon-silicon linkage with an organic halide at an elevated temperature.

As used herein, the term "organohalogenopolysilane" for instance, an organohalogenodisilane, is intended to mean organic compounds containing the unit structure

where Z is an organic radical, and at least one of the silicon atoms of the polysilane contains a silicon-bonded halogen atom, e. g., chlorine, bromine, fluorine, etc., the other valences of the silicon atoms being satisfied by a member selected from the class consisting of hydrogen, an organic radical, halogen and another silicon atom. Polysilicon compounds containing a plurality (i. e., at least two) of adjacent silicon atoms, as for instance, those described and claimed in Burkhard application, Serial No. 47,342, filed September 1, 1948, now U. S. Patent 2,554,976, issued May 29, 1951, and assigned to the same assignee as the present invention, are also included.

The organic halides employed in the practice of our claimed invention may be considered as corresponding to the general formula R'X, where R' is a monovalent hydrocarbon radical (for instance, methyl, ethyl, propyl, butyl, isobutyl, hexyl, etc.), alkyl (for instance, phenyl, naphthyl, etc.), alkaryl (for instance, tolyl, xylyl, ethylphenyl, etc.), aralkyl (for instance, benzyl, phenylethyl, etc.), vinyl, allyl, cyclohexyl, cyclohexenyl, thienyl, etc., and X is a halogen (e. g., chlorine, bromine, fluorine, etc.).

The primary object of this invention is to provide a method for preparing organohalogenomonosilanes.

Another object of the invention is to produce mixed organohalogenomonosilanes containing different organic groups attached to the same silicon atom by a C—Si linkage.

A still further object of the invention is to prepare methyl phenyldichlorosilane.

Further objects of this invention will become more apparent as the description thereof proceeds.

In accordance with our invention we have discovered that if an organohalogenopolysilane of the type described previously is heated with an organic halide at a suitable elevated temperature, we are able to obtain compositions of matter in which the organic residue of the organic halide becomes attached to one of the silicon atoms comprising the silicon-silicon linkage in the organohalogenopolysilane to give a halogenomonosilane containing the organic residue of the organic halide attached to the silicon atom by a C—Si linkage. Our invention is particularly applicable to the heat treatment of a mixture comprising the organic halide, preferably an aromatic halide, and individual disilane compounds or high boiling fractions comprising a mixture of disilane compounds corresponding to the general formula $Si_2X_n(R)_{6-n}$ where R is a monovalent hydrocarbon radical (for instance, an alkyl, aryl, alkaryl, aralkyl, etc., radical), X is a halogen (for instance, chlorine, bromine, fluorine, etc.), and $n$ is an integer equal to from 1 to 5, inclusive. Such disilane compositions of matter are obtained usually during the passage of a hydrocarbon halide over heated silicon, preferably in the presence of a catalyst, in accordance with the disclosures and teachings in Rochow Patent U. S. 2,380,995, issued August 7, 1945, and assigned to the same assignee as the present invention. In addition to the usual organohalogenosilanes obtained, mixtures of organohalogenodisilanes corresponding to the above formula are also obtained. These high boiling organohalogenopolysilanes have been found to be useful as a primer coating for treating various surfaces to reduce their adhesion to ice as is more particularly disclosed and claimed in the copending application of Robert Smith-Johannsen, Serial No. 56,673, filed October 26, 1948, now U. S. Patent 2,575,141, and assigned to the same assignee as the present invention.

When methyl chloride is passed over heated silicon in the presence of e. g., a copper catalyst, in a manner disclosed in the aforementioned Rochow patent, there is usually obtained a fraction comprised essentially of a mixture of compounds embraced by the aforementioned formula $Si_2X_n(R)_{6-n}$ where R is a methyl group. This mixture of compounds comprises a high boiling residue (the bulk of this residue boiling from about 125° to 175° C.) and comprises for the most part large amounts of dimethyltetrachlorodisilane (including its various isomers such as, for instance, 1,1-dimethyl-1,2,2,2-tetrachlorodisilane, 1,2 - dimethyl-1,1,2,2 - tetrachlorodisilane, etc.) and trimethyltrichlorodisilane (including its various isomers), as well as small amounts of methylpentachlorodisilane and tetramethyldichlorodisilane (including its isomers).

In accordance with our claimed method, it is believed that by heating the aforementioned organohalogenopolysilane with an organic halide, an intermediate reaction takes place whereby rupture of the silicon-silicon bonds is effected to give for a very short time silicon atoms containing unsatisfied silicon valences. At the same time, as a result of the heat treatment, it is believed the organic halide also splits to give atomic halogen and a free organic radical. During this period of time many of the free organic radicals attach to the unsatisfied silicon bonds to form C—Si linkages while at the same time maintaining the attachment to the silicon atom of the halogen atom originally attached thereto. By means of such reaction it is possible to modify the type of product obtained if the organohalogenopolysilane is heated at elevated temperatures in the absence of the organic halide. The treatment of organohalogenopolysilanes alone is more particularly disclosed and claimed in our co-pending application, Serial No. 111,102, filed concurrently herewith and assigned to the same assignee as the present invention.

The reaction is advantageously conducted in the vapor phase at elevated temperatures sufficiently high to effect rupturing of the Si—Si bond but below the decomposition of the formed monosilanes. Good results are obtained when temperatures of the order of from about 250° to 800° C. are employed. When methylhalogenodisilanes are employed in our process, it is preferred to conduct the reaction at a temperature of from 350° to 600° C. Although any organic halide may be used in our invention, we prefer to work with aromatic halides, (for instance, chlorobenzene, bromobenzene, chlorinated diphenyl, chloronapthalene, etc.). One method for effecting the reaction comprises passing a mixture of the organic halide and the organohalogenopolysilane through a heated tube maintained at the required temperature and collecting the lower molecular weight materials issuing from the exit end of the reaction tube. It will, of course, be apparent to those skilled in the art that the heated zone through which the organic halide and polysilane are passed may be packed with various materials usually employed in cracking processes and that such materials may have interspersed therein catalysts capable of accelerating the cracking process.

In order that those skilled in the art may better understand how the present invention may be practiced, the following example is given by way of illustration and not by way of limitation:

Example 1

A mixture comprising methylchlorodisilanes (heated to the vapor phase) described previously and obtained as a high boiling residue (the bulk boiling above 125° C.) from the reaction between methylchloride and heated silicon in the presence of copper as a catalyst, was passed through a steel tube 54" long and 2½" wide while the latter was heated at around 520° C. at atmospheric pressure. Simultaneous with the passage of the methylchlorodisilanes was passed an equal amount, by weight, of chlorobenzene (also in the vapor phase). The resultant reaction product was cooled, fractionally distilled, and analyzed to determine the various materials obtained during the reaction. The analysis indicated that both methylphenyldichlorosilane and phenyltrichlorosilane were obtained in the reaction mixture. The results of these tests establish that the simultaneous passage of an aromatic halide, in this case chlorobenzene, with an organohalogenodisilane under the recited reaction conditions gives organohalogenosilane products containing only one silicon atom to which is attached the aromatic residue of the aromatic halide, in this case the phenyl radical, by a carbon-silicon bond.

In addition to the halogenodisilanes employed above, we may also use other halogenodisilanes corresponding to the above-identified general formula $Si_2X_n(R)_{6-n}$ where R is any monovalent organic radical, for example, an alkyl radical (for instance ethyl, propyl, butyl, isobutyl, amyl, decyl, etc.), aryl radical (for instance, phenyl, naphthyl, anthracyl, etc.), alkaryl radical (for instance, tolyl, xylyl, ethylphenyl, etc.), aralkyl radical (for instance, benzyl, phenyl-ethyl, etc.), other saturated and unsaturated aliphatic and cycloaliphatic radicals, for instance, vinyl, allyl, butadienyl, propinyl, cyclohexanyl, cyclohexenyl, cyclopentanyl, etc., radicals, and X and $n$ have the meanings given above. The organic radicals mentioned above which are present in the organohalogenodisilane may have attached to them other groups, for example, halogens, nitro radicals, etc., which are essentially inert at the elevated temperatures at which the claimed invention is conducted.

In addition to the aromatic halide employed in Example 1, other organic halides, both unsubstituted and substituted with non-reactive substituents (e. g., other halogens, etc.), many examples of which have been given previously, may also be employed. The amount of organic halide used in our claimed process is not critical and may be varied within wide limits. Generally, we may use from 0.5 to 5 or 10 or more parts by weight of aromatic halide per part of organohalogenopolysilane.

It will also be understood by those skilled in the art that the temperatures employed in the practice of the invention may be varied within the limitation mentioned previously, and that pressures other than atmospheric (for example, superatmospheric and subatmospheric pressures) may also be employed without departing from the scope of the invention. Vapor phase reactions have been found to be eminently suitable. In addition, other organohalogenopolysilanes having more than two (e. g., 3 to 10 or more) adjacent silicon atoms and containing the structural unit

described earlier, where Z is an organic radical having a meaning such, for instance, as assigned to R in the organohalogenodisilane may also be employed without departing from the scope of the claimed invention. Among such compounds may be mentioned dimethylhexachlorotrisilane, tetrachlorotetramethyltrisilane, pentaethylpentachlorotetrasilane, etc.

As pointed out previously, our invention has particular application to the reaction of aromatic halides with high boiling residues obtained by the passage of a hydrocarbon halide over heated silicon. Such high boiling residues which often comprise approximately 10% of the total reaction product can be degraded in the presence of the aromatic halide to give lower molecular weight monosilanes thereby increasing the yields of monomeric materials, that is, organohalogenomonosilanes.

What we claim as new and desire to secure by Letters Patent of the United States is:

1. The method which comprises heating a composition comprising as an essential ingredient an hydrocarbon-substituted halogenopolysilane containing a silicon-silicon linkage in the presence of an hydrocarbon halide at a temperature of at least 250° C. and below the decomposition point of the formed halogenomonosilanes.

2. The process which comprises heating at a temperature of from 250° to 800° C. a mixture of ingredients comprising as an essential ingredient a methylchlorodisilane and chlorobenzene so as to obtain a volatile product containing methylphenyldichlorosilane.

3. The process which comprises heating a mixture of ingredients comprising (1) an aryl halide and (2) a composition consisting essentially of a mixture of hydrocarbon-substituted halogenodisilanes corresponding to the general formula $Si_2X_n(R)_{6-n}$ where R is a monovalent hydrocarbon radical, X is a halogen and $n$ is an integer equal to from 1 to 5, the aforesaid heating being conducted at a temperature of at least 250° C. and below the decomposition point of the formed halogenomonosilanes.

4. The process which comprises heating at a temperature of from 350° to 600° C. a mixture comprising (1) chlorobenzene and (2) a composition of matter consisting essentially of a mixture of methylchlorodisilanes corresponding to the general formula $Si_2Cl_n(CH_3)_{6-n}$ where $n$ is an integer equal to from 1 to 5.

5. The process which comprises heating a mixture of ingredients comprising (1) an alkyl halide and (2) a composition consisting essentially of a mixture of hydrocarbon-substituted halogenodisilanes corresponding to the general formula $Si_2X_n(R)_{6-n}$ where R is a monovalent hydrocarbon radical, X is a halogen and $n$ is an integer equal to from 1 to 5, the aforesaid heating being conducted at a temperature of at least 250° C. and below the decomposition point of the formed halogenomonosilanes.

6. The process which comprises heating at a temperature of from 250° to 800° C. a mixture of ingredients comprising as an essential ingredient a methylchlorodisilane and methyl chloride so as to obtain a volatile product containing methylchlorosilane.

DONALD MOHLER.
JESSE E. SELLERS.

REFERENCES CITED

The following references are of record in the file of this patent:

UNITED STATES PATENTS

| Number | Name | Date |
|---|---|---|
| 2,474,087 | Barry et al. | June 21, 1949 |

OTHER REFERENCES

Palmer et al., Jour. Chem. Soc. (London), vol. 133 (1930), pp. 1020-28.

Rochow, Chemistry of the Silicones (1946), pp. 5 and 46, Wiley and Sons, publishers.